United States Patent Office 3,535,307
Patented Oct. 20, 1970

3,535,307
HIGH MOLECULAR WEIGHT POLYETHER BLOCKED POLYMERS
Philip H. Moss and Michael Cuscurida, Austin, Tex., assignors to Jefferson Chemical Company, Inc., Houston, Tex.
No Drawing. Continuation-in-part of applications Ser. No. 335,000, Jan. 2, 1964, and Ser. No. 420,431, Dec. 22, 1964. This application Sept. 27, 1967, Ser. No. 671,097
Int. Cl. C07c 47/18, 95/04
U.S. Cl. 260—209
7 Claims

ABSTRACT OF THE DISCLOSURE

High molecular weight polyether block polymers are prepared by the sequential alkoxylation of a polyfunctional initiator with alkylene epoxide components to provide polyether polyols that can be used in the preparation of polyurethanes having improved properties.

CROSS-REFERENCE TO OTHER APPLICATIONS

This invention is a continuation-in-part of copending Cuscurida application Ser. No. 335,000, filed Jan. 2, 1964, now abandoned, and entitled "Preparation and Utilization of Polyethers," and our copending application Ser. No. 420,431, filed Dec. 22, 1964, now abandoned..

DISCUSSION OF THE INVENTION

In recent years, substantial production of flexible, semi-flexible, rigid and elastomeric polyurethanes has become an accomplished commercial fact. A significant portion of the polyurethane foam is prepared by either a catalytic prepolymer technique or a so-called "one-shot" technique wherein a polyether component having an average functionally of two or more (e.g., two to eight) and a molecular weight of about 2,000 to about 10,000 is catalytically reacted with an excess of an organic polyisocyanate in the presence of a gas-generating agent under foam-forming conditions.

Polyoxypropylene polyethers, such as polyoxypropylene diols, triols, tetrols, etc., are normally used for this purpose. The results, although generally satisfactory, have left much to be desired, particularly with polyethers having comparatively high molecular weights of 2,000 to 25,000 and with respect to the polyurethane reaction products prepared therefrom.

Thus, it has been observed in accordance with the present invention that the preparation of higher molecular weight polyethers presents difficulties that are not encountered with lower molecular weight products. In particular, there is a progressively increased tendency for dehydration of the polyoxyalkylene chains to occur when propylene oxide or similar epoxides are employed during alkoxylation. When dehydration occurs, the terminal group becomes olefinically unsaturated and will not react further. This not only reduces the number of active sites for chain extension, but also reduces the overall functionality of the polyether product, which has a pronounced bearing on its reactivity with organic polyisocyanates. Finally, the unreacted chains that are terminally unsaturated adversely affect the physical properties of polyurethanes prepared by the reaction of the polyisocyanate with the polyether.

Propylene oxide and other epoxides containing more than three carbon atoms, such as 1,2-butylene oxide, 2,3-butylene oxide, styrene epoxide, etc., hereafter referred to as "$C_3+$ epoxides," are the epoxides that have a significant tendency to dehydrate.

In accordance with the present invention, however, the provision of comparatively high molecular weight conjugated polyoxyalkylene polyethers having only minor terminal unsaturation is accomplished. Briefly, this is done by first partially alkoxylating an initiator with a $C_3+$ oxyalkylene component to provide an intermediate having a molecular weight of about 300 to 2,000, by then ethoxylating the intermediate with from about 5% to 15% of ethylene oxide to provide new primary hydroxy sites and by then completing the alkoxylation with a second $C_3+$ oxyalkylene component, which is the same as or different from the first, to provide the desired molecular weight.

The initiator to be used in accordance with the present invention should be an initiator containing two or more reactive hydrogen atoms such as, for example, an initiator containing from about two to eight reactive hydrogen atoms. Preferred initiators, however, could be those having from about three to about eight reactive hydrogen atoms.

The term "reactive hydrogen atom" is well known and clearly understood by those skilled in the art. As used herein, and in the appended claims, it includes any hydrogen atom which is sufficiently labile to open the epoxide ring of 1,2-propylene oxide or ethylene oxide and which reacts with methyl magnesium iodide to liberate methane in the classical Zerewitinoff reaction (see Niederl and Niederl, "Micro Methods of Quantitative Organic Analysis," page 263, John Wiley and Sons, New York City, 1946). Examples of suitable initiators that may be used include polyhydroxy compounds, carboxylic acids, amines, etc. Polyhydroxy compounds that can be used as initiators include polyhydric alcohols, such as ethylene glycol, propylene glycol, tri-methylolpropane, glycerol, sorbitol, sucrose, methyl glucoside, etc., and polyhydric compounds produced by a Mannich condensation such as that described in U.S. Pat. 3,297,597. Amines, such as monoethanolamine, diethanolamine, piperazine, N-aminoethylpiperazine, etc., may also be used. Propylene oxide adducts of polyhydric alcohols, Mannich condensation products, and propylene adducts of amines are especially preferred initiators for our invention. It will be understood, however, that the unreacted initiator as described above is equally applicable to the practice of our invention.

The base-catalyzed reaction of alkylene epoxides with a polyhydric initiator is well known to those skilled in the art. Basic conditions may be established with a wide variety of materials. The bases normally used include alkali metals, their hydroxides, oxides and hydrides, etc., and basic amines such as trimethylamine, triethylamine, etc. Thus, sodium, potassium, calcium and sodium hydroxide, oxide, hydride, etc., may be used with satisfactory results.

It is normally desirable to add the epoxide to the initiator in stages when high molecular weight products are desired. The first $C_3+$ alkylene epoxide component that is added to the initiator in accordance with the present invention in one or more steps may consist of propylene oxide, or may comprise a mixture of alkylene epoxides having an oxygen to carbon atom ratio of less than 0.4 (e.g., mixtures of propylene oxide or butylene oxide with each other or with ethylene oxide, or both). The first $C_3+$ component is added in an amount sufficient to provide oxyalkylene chains, each of which should have an average molecular weight within the range from about 200 to about 2,000. More preferably, the individual chains will have an average molecular weight from about 800 to about 1,500. After this stage is complete, a second epoxide component, composed exclusively or principally of the ethylene oxide, is added. This component is added in a minor amount, which is preferably within the range from about 5% to about 35% by weight of the total weight of the intermediate. As a consequence of this step, terminal primary hydroxy groups are introduced which significantly enhance the reactivity of the molecule.

Thereafter, a third $C_3+$ oxyalkylene component is added which, again, is composed of epoxides used alone or in admixture sufficient to provide an oxygen to carbon atom ratio of less than 0.4 (i.e., propylene oxide or butylene oxide or mixtures of these two with each other or with ethylene oxide). The third component is added until the polyoxyalkylene chains thereof have an average molecular weight of about 500 to about 2,500 each (e.g., a total chain length for the first, second and third components of about 700 to 10,000).

It will be understood, of course, that catalyst can be added from time to time, as needed, during the course of the alkoxylations.

At the end of the alkoxylation, as described above, the conjugated polyoxyalkylene compound which will now have an average molecular weight of from about 2,000 to about 25,000, may be neutralized with a suitable acid such as sulfuric acid, solid organic acids, hydrochloric acid, etc., and filtered to remove the insoluble salts.

If desired, however, and prior to the neutralization and recovery, an additional quantity of alkylene oxides may be added; the amount of ethylene oxide being sufficient to provide a fourth epoxide component having an oxygen to carbon atom ratio of greater than 0.4. This component, however, should comprise but a minor amount of the total epoxide, constituting from about 1–15 wt. percent of the total weight of the polyether.

As has been pointed out in our copending application, supra, theoretical considerations might sugest that the primary hydroxyl content of either the ethoxylated intermediate or the final ethoxylated product would be proportional to the amount of ethylene oxide employed. However, such is not the case. Thus, even in the absence of ethylene oxide, the primary hydroxyl content of a propylene oxide termintated polyol is normally in excess of 1% and may be as much as 5%. However, with the addition of 1–15 wt. percent of ethylene oxide, in accordance with the present invention, a reaction product is provided having a primary hydroxyl group content of about 5% to 60%. With the use of 5% of ethylene oxide as the final ethoxylation step, a reaction product will be provided having a primary hydroxyl content of about 10% to 40%. With 10% of added ethylene oxide, the primary hydroxyl content of the reaction product will normally range from about 40% to about 60%. Even with 15% or more of ethylene oxide, a primary hydroxyl content of more than about 60% is attainable with great difficulty, if at all.

As has been indicated, the polyethers of the present invention are useful in the preparation of polyurethanes.

The reaction of organic compounds containing a plurality of isocyanate groups with organic polyols has long been known and is well described in the literature. The preparation of a polyurethane by this reaction is complex and requires the use of various other components, depending on the properties desired. Such other components include, for example, water, blowing agents, foam stabilizers, fire retardants, and one or more catalysts. The amount of each component must be carefully controlled, and it is sometimes necessary to vary the concentration of one component while leaving the others unchanged.

Examples of suitable organic polyisocyanates that may be used include aromatic or aliphatic polyisocyanates, such as diphenyl-4,6,4'-triisocyanate, 3,3'-dichloro-4,4'-biphenyl diisocyanate, diphenyl diisocyanate, ethylene diisocyanate, propylene-1,2-diisocyanate, octamethylene diisocyanate, 1,4-tetramethylene diisocyanate, meta- and paraphenylene diisocyanates, xylene-1,4-diisocyanate, xylene-1,3-diisocyanate, naphthalene-1,4-diisocyanate, 2,4- and 2,6-toluene diisocyanates, diphenylmethane diisocyanates, hexamethylene diisocyanate, furfurylidene diisocyanate, p-isocyanatobenzylisocyanate, polymethylene polyphenylisocyanates, etc., and mixtures thereof.

The most commonly used foam stabilizers are organic silanes or siloxanes, usually silicone-glycol copolymers. Such materials may be those having the general formula:

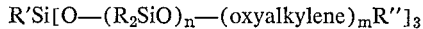

$$R'Si[O-(R_2SiO)_n-(oxyalkylene)_mR'']_3$$

Wherein R, R' and R'' are alkyl groups containing 1–4 carbon atoms, $n$ is 4–8, $m$ is 20–40 and the oxyalkylene groups are derived from ethylene oxide or propylene oxide, or both.

Blowing agents used in the preparation of urethane foam are described, for example, in U.S. Pat. No. 3,072,582. Blowing agents are generally volatile liquids, such as, for example, fluorocarbons. The blowing of foam is sometimes accomplished by using a small amount of water and an excess of polyisocyanate. The water reacts with the isocyanate, generating carbon dioxide which acts as the blowing agent.

Fire retardants that can be incorporated into the components are of two types. The first of these are those that are incorporated by mere mechanical mixing and include, for example, tris(chloroethyl)phosphate, tris(2, 3 - dibromopropyl)phosphate, diammonium phosphate, halogenated compounds and antimony oxide. The second type of fire retardant are those that become chemically bound in the polymer chain. An example of this type of fire retardant includes chlorendic acid derivatives and various phosphorus-containing polyols.

Catalysts that may be used alone or in admixture include, for example, tertiary amines, such as triethylenediamine, 2-methyltriethylenediamine, N-methylmorpholine, N-ethylmorpholine, triethylamine, trimethylamine, etc., and mixtures thereof. Also organic tin compounds may be used such as, for example, stannous octoate, stannous oleate, stannous laurate, dibutyltin di-2-ethylhexoate, dibutyltin dibutoxide and dibutyltin dilaurate. The corresponding lead, zinc and iron compounds have also been suggested for this use.

The invention will be further illustrated with reference to the following specific examples which are given by way of illustration rather than by way of limitation on the scope of this invention.

EXAMPLE I

This example will demonstrate the preparation of a trimethylolpropane-propylene oxide (62.3 mols)-ethylene oxide (20 mols)-propylene oxide (15 mols) block polymer. This product had a molecular weight of 4,100 as calculated from a hydroxyl number of 41.1.

Into a 10-gallon kettle was charged 8 lbs. of a 600 molecular weight trimethylolpropane-propylene oxide adduct and 127 g. flaked potassium hydroxide. The reactor was then purged with an inert gas and heated to 110° C. Propylene oxide (44.3 lb.) was then added at 110°–115° C. at 60 p.s.i.g. Approximately five hours were required for addition of the propylene oxide. The reaction mixture was then digested to an equilibrium pressure (1.5–2.0 hrs.). Ethylene oxide (12.3 lb.) was then added over a 45-minute period at 110°–115° C. at 60 p.s.i.g. An additional 12.2 lb. of propylene oxide was then reacted over a one-hour period at 110°–115° C. at 60 p.s.i.g. After digestion to an equilibrium pressure (1.5–

2.0 hrs.), the alkaline product was neutralized with a solid organic acid. An antioxidant and filter aid were also added at this time. The neutrilazed product was vacuum stripped to minimum pressure at 110°–120° C. nitrogen stripped one-half hour at 110°–120° C. and filtered through a heated filter. Properties of this product are summarized in the following table.

TABLE 1

| | |
|---|---|
| Acid No., mg. KOH/g. | 0.04 |
| Hydroxyl No., mg. KOH/g. | 41.1 |
| Water, wt. percent | 0.03 |
| Unsaturation,[1] meq./g. | 0.04 |
| Ash, wt. percent | 0.0005 |
| Sodium, p.p.m. | 0.1 |
| Potassium, p.p.m. | 1.7 |
| Color, Pt-Co | 10 |
| pH in 10:6 isopropanol-water | 5.0 |

[1] Mercuric acetate method.

This experiment indicates that polyols with a lower unsaturation content can be prepared using this technique. This block polymer had an unsaturation value of 0.04 meq./g., as compared to 0.06 meq./g. for a glycerine-propylene oxide condensate in this molecular weight range.

EXAMPLE II

This example will illustrate the preparation of trimethylolpropane-propylene oxide-ethylene oxide-propylene oxide block polymers in the 3,000 molecular weight range. In these experiments, the trimethylolpropane was first condensed with propylene oxide to form a product of approximately 2,000 molecular weight. The reaction was continued by addition of 10–20 wt. percent ethylene oxide (basis weight of product) and finally terminated with 15 mols propylene oxide to a molecular weight of approximately 3,000 as calculated from the hydroxyl number. The basic procedure described in Example I was used in this investigation. Details of preparation of the 3,000 molecular weight block polymers are summarized in Table 2.

TABLE 2.—PREPARATION OF 3,000 MOLECULAR WEIGHT BLOCK POLYMERS

| | Run No. | | |
|---|---|---|---|
| | 2,870-27 | 2,870-29 | 2,870-31 |
| Charge: | | | |
| Triol T-600 [1], lb. | 10 | 10 | 10 |
| Potassium hydroxide, g. | 159 | 159 | 159 |
| Propylene oxide, lb. (step 1) | 29.5 | 27.4 | 24.35 |
| Ethylene oxide, lb. | 6.0 | 9.23 | 12.3 |
| Propylene oxide, lb. (step 2) | 14.5 | 14.9 | 14.85 |
| Percent ethylene oxide in polymer | 10 | 15 | 20 |
| Property: | | | |
| Acid No., mg. KOH/g. | 0.06 | 0.09 | 0.06 |
| Unsaturation, meq./g. | 0.03 | 0.019 | 0.023 |
| Hydroxyl No., mg. KOH/g. | 62.3 | 58.9 | 60.7 |
| Ash, wt. percent | Nil | 0.0003 | 0.0002 |
| Sodium, p.p.m. | 0.25 | 0.3 | 0.6 |
| Potassium, p.p.m. | 9.6 | 1.95 | 7.0 |

[1] 600 molecular weight trimethylolpropane, propylene oxide adduct.

These experiments further show that polyols with a significantly lower terminal unsaturation content can be prepared using this procedure. The block polymers containing 10, 15 and 20 wt. percent ethylene oxide contained 0.03, 0.019 and 0.023 meq./g. unsaturation. By contrast a glycerine-propylene oxide adduct in this molecular weight range contained 0.04 meq./g. unsaturation.

EXAMPLE III

This example will illustrate the lower silicone oil requirement for the 41 hydroxyl number block polymer described in Example I. Stable foams have been prepared from this block polymer using 0.33 p.b.w. silicone oil per 100 p.b.w. resin. The minimum silicone oil requirement for flexible foams based on a 3,000 molecular weight glycerine-propylene oxide resin (Thanol F–3000) was found to be 1.0 p.b.w. per 100 p.b.w. polyol. Formulations, details of preparation and properties of foams prepared from this block polymer are summarized in Table 3.

TABLE 3.—FLEXIBLE FOAMS FROM BLOCK POLYMER

| | Foam No. | | | | |
|---|---|---|---|---|---|
| | 2854-1b | 2854-1e | 2854-2b | 2854-2d | 2854-2e |
| Formulation, p.b.w.: | | | | | |
| Block polymer [1] | 100 | 100 | 100 | | |
| Thanol F-3000 [2] | | | | 100 | 100 |
| Water | 3.7 | 3.7 | 3.7 | 3.7 | 3.7 |
| SF-1034 silicone | 1.0 | 0.5 | 0.33 | 1 | 0.5 |
| Triethylenediamine | 0.1 | 0.1 | 0.1 | 0.1 | 0.1 |
| N-ethylmorpholine | 0.1 | 0.1 | 0.1 | 0.1 | 0.1 |
| Stannous octoate (C-4) [3] | 0.4 | 0.45 | 0.45 | 0.35 | 0.35 |
| Toluene diisocyanate | 45.9 | 45.9 | 45.9 | 48.5 | 48.5 |
| Isocyanate index | 1.09 | 1.09 | 1.09 | 1.09 | 1.09 |
| Details of preparation: | | | | | |
| Stirrer | [4] | [4] | [4] | [4] | [4] |
| Speed, r.p.m. | 2,200 | 2,580 | 2,580 | 2,580 | 2,580 |
| Cream time, sec. | 8 | 8 | 9 | 9 | 10 |
| Rise time, sec. | 100 | 85 | 75 | 80 | 75 |
| Tack-free, min. | 30 | 30 | 25 | 25 | |
| Physical properties, Density, p.c.f. | 2.0 | 2.0 | 2.2 | 1.7 | [5] |
| ILD, two-in.: | | | | | |
| 25% | 37 | 39 | 38 | 32 | |
| 65% | 75 | 75 | 82 | 65 | |
| Compression set: | | | | | |
| 50% | 2.4 | 2.6 | 3.0 | 2.9 | |
| 90% | 6.7 | 4.8 | 5.8 | 5.2 | |
| Tensile, p.s.i. | 18 | 15 | 15 | 17 | |
| Elongation, percent | 177 | 133 | 170 | 189 | |
| Cells per inch | 40–50 | 25 | 20 | 40 | |

[1] Trimethylolpropane, propylene oxide (62.6 mols), ethylene oxide (20 mols), propylene oxide (15 mols).
[2] 3,000 molecular weight glycerine, propylene oxide condensate.
[3] Basis 100% catalyst.
[4] Cowles.
[5] Foam collapsed.

EXAMPLE IV

This example will illustrate the preparation of a 6,720 molecular weight (hydroxyl No. 25) block polymer based on aminoethylpiperazine. A three mol adduct of propylene oxide and aminoethylpiperazine was further reacted with propylene oxide to produce a triol having 107 hydroxyl number.

Into a ten-gallon kettle was charged 10 lb. of this triol and 123.2 g. 50% aqueous potassium hydroxide. The reactor was then evacuated and purged with nitrogen. Water was removed by vacuum stripping at 100° C. When a minimum pressure was reached, the reaction charge was stripped 30–45 minutes employing a nitrogen bleed. Propylene oxide (25.7 lb.) was then reacted at 110°–115° C. at 60 p.s.i.g. over a four-hour period. The reaction mixture was then digested to an equilibrium pressure. Ethylene oxide (2.72 lb.) was then added at 110°–115° C. This was followed by the addition of 10.5 lb. propylene oxide at 110°–115° C. over a two hour period. After attaining equilibrium, the alkaline mixture was purged with nitrogen for 30 minutes. The reaction was terminated by reaction with 5.44 lb. ethylene oxide at 110°–115° C. The product was then neutralized at 95° C. with 296 g. 25% aqueous oxalic acid. Di-t-butyl p-cresol (22.2 g.) and Hyflo Supercel filter aid (150 g.) were also added at this time. The neutralized product was vacuum stripped to minimum pressure at 110° C., nitrogen stripped one-half hour at 300 mm., and filtered at 110°–120° C. The product had the following properties:

| | |
|---|---|
| Hydroxyl No., mg. KOH/g. | 25 |
| Water, wt. percent | 0.03 |
| Sodium, p.p.m. | 0.02 |
| Potassium, p.p.m. | 0.25 |

EXAMPLE V

This example will illustrate the preparation of a 5,750 molecular weight (hydroxyl number 29.3) block polymer based on a Mannich condensation product. Phenol, formaldehyde and diethanolamine were reacted in the Mannich reaction at mol ratios of 1:1:1. The product was then propoxylated to a molecular weight of about 1,500. The block polymer was then prepared using the procedure of Example IV and the following reactants:

| | |
|---|---|
| 1,500 molecular weight propylene oxide adduct of the Mannich polyol, lb. | 10 |
| Potassium hydroxide, flaked, g. | [1] 61.6 |
| Propylene oxide (step 1), lb. | 25.7 |
| Ethylene oxide (step 1), lb. | 2.72 |
| Proplyene oxide (step 2), lb. | 10.5 |
| Ethylene oxide (step 2), lb. | 5.44 |
| Oxalic acid, g. | [2] 74 |
| Di-t-butyl p-cresol, g. | 22.2 |
| Hyflow Supercel, g. | 150 |

[1] Added as 50% aqueous solution.
[2] Added as 25% aqueous solution.

The finished product had the following properties:

| | |
|---|---|
| Hydroxyl No., mg. KOH/g. | 29.3 |
| Water, wt. percent | 0.2 |
| Potassium, p.p.m. | 1.0 |
| Sodium, p.p.m. | 0.67 |

EXAMPLE VI

This example will illustrate the preparation of a 15,600 molecular weight (hydroxyl number 21.6) block polymer of sorbitol. A 700 molecular weight propylene oxide adduct of sorbitol was used as the initiator for the reaction. The preparation of the block polymer can be described as follows:

Into a ten-gallon kettle was charged 10 lb. of the 700 molecular weight propylene oxide adduct of sorbitol and 254 g. 50% aqueous potassium hydroxide. The reactor was then evacuated and purged with nitrogen. Water was removed by vacuum stripping at 100° C. When a minimum pressure was reached, the reaction charge was stripped 30–45 minutes employing a nitrogen bleed. Propylene oxide (58.8 lb.) was then reacted at 110°–115° C. at 60 p.s.i.g. over a 4.5 hour period. The reaction mixture was then digested to an equilibrium pressure. Ethylene oxide (7.42 lb.) was then added at 110°–115° C. The product was then neutralized at 95° C. with 1,016 g. 25% aqueous acid. Di-t-butyl p-cresol (30.4 g.) and Hyflo Supercel filter aid (1.50 g.) was also added at this time. The neutralized product was vacuum stripped to minimize pressure at 110° C., nitrogen stripped one-half hour at 300 mm., and filtered at 110°–120° C. A 6,000 molecular weight (hydroxyl number 56) intermediate product was recovered.

Into a ten-gallon kettle was charged 20 lbs. of the 56 hydroxyl number intermediate product and 136 g. 50% aqueous potassium hydroxide. The reactor was then evacuated and thoroughly purged with nitrogen. Water was then removed by vacuum stripping at 100° C. When a minimum pressure was reached, the reaction charge was stripped 30–45 minutes employing a nitrogen bleed. Propylene oxide (55 lbs.) was then reacted at 110°–115° C. at 50 p.s.i.g. over an eight hour period. The reaction mixture was then digested to an equilibrium pressure and purged with nitrogen for 30 minutes. Ethylene oxide (8.34 lbs.) was then added at 110°–115° C. After digestion to an equilibrium pressure, the alkaline product was neutralized at 95° C. with 546 g. 25% aqueous oxalic acid. Di-t-butyl p-cresol (34 g.) and Hyflo Supercel (150 g.) were also added at this time. The neutralized product was vacuum stripped to minimum pressure, nitrogen-stripped one-half hour at 300 mm., and filtered at 110°–120° C. The product had the following properties:

| | |
|---|---|
| Acid No., mg., KOH/g. | 0.03 |
| Hydroxyl No., mg. KOH/g. | 21.6 |
| Unsaturation, meq./g. | 0.14 |
| Water, wt. percent | 0.01 |
| Ash, wt. percent | nil |
| Sodium, p.p.m. | 0.2 |
| Potassium, p.p.m. | 1.2 |
| Color, Pt-Co | 20 |
| pH in 10:6 isopropanol-water | 5.6 |
| Viscosity, 25° C., c.p.s. | 2240 |

EXAMPLE VII

This example will illustrate the preparation of an 8,700 molecular weight (hydroxyl number 25.8) block polymer of methyl glucoside. A 535 molecular weight propylene oxide adduct of methyl glucoside was used as an initiator to produce an intermediate 4,320 molecular weight product. The block polymer was prepared using the procedure of Example VI and the following charges:

| | Step 1 | Step 2 |
|---|---|---|
| Initiator, lb | 10 | |
| Intermediate | | 20 |
| Potassium hydroxide, g.[a] | 159 | 62 |
| Propylene oxide, lb | 65.3 | 29.2 |
| Ethylene oxide, lb | 8.33 | 5.46 |
| Oxalic acid, g.[b] | 286 | 124 |
| Di-t-butyl p-cresol, g | 24.2 | 22.3 |
| Hyflo Supercel, g | 200 | 150 |

[a] Added as 50% aqueous solution.
[b] Added as 25% aqueous solution.

The 8,700 molecular weight product had the following properties:

| | |
|---|---|
| Acid No., mg. KOH/g. | 0.02 |
| Hydroxyl No., mg. KOH/g. | 25.8 |
| Unsaturation, meq./g. | 0.10 |
| Water, wt. percent | 0.02 |
| Ash, wt. perecnt | nil |
| Sodium, p.p.m. | 0.05 |
| Potassium, p.p.m. | 0.4 |
| Color, Pt-Co | 50 |
| pH in 10:6 isopropanol water | 5.9 |
| Viscosity, 25° C., c.p.s. | 1595 |

EXAMPLE VIII

This example will illustrate the preparation of a 22,000 molecular weight (hydroxyl No. 20.4) block polymer of sucrose. A 1,030 molecular weight propylene oxide adduct of sucrose was used as an initiator to produce an 8,850 molecular weight intermediate product. The block polymer was prepared using the procedure of Example VI and the following charges:

|  | Step 1 | Step 2 |
|---|---|---|
| Initiator, lb | 8 | |
| Intermediate | | 20 |
| Potassium hydroxide, g.[a] | 127 | 68 |
| Propylene oxide, lb | 58.8 | 55 |
| Ethylene oxide, lb | 7.42 | 8.34 |
| Oxalic acid, g.[b] | 254 | 143 |
| Di-t-butyl p-cresol, g | 30.4 | 34 |
| Hyflo Supercel, g | 150 | 150 |

[a] Added as 50% aqueous solution.
[b] Added as 25% aqueous solution.

The product had the following properties:

| | |
|---|---|
| Acid No., mg. KOH/g. | 0.2 |
| Hydroxyl No., mg. KOH/g. | 20.4 |
| Unsaturation, meq./g. | 1.13 |
| Water, wt. percent | 0.03 |
| Ash, wt. percent | 0.001 |
| Sodium, p.p.m. | 0.2 |
| Potassium, p.p.m. | 0.05 |
| Color, Gardner | 2–3 |
| pH in 10:6 isopropanol water | 6.0 |

We claim:

1. A mixture of conjugated polyoxyalkylene compounds for use in the preparation of polyurethanes, said compounds consisting of:
   (A) the nucleus of an organic reactive hydrogen compound selected from the group consisting of polyhydroxy compounds, amines and propylene oxide adducts of said compounds having from three to eight reactive hydrogen atoms per molecule;
   (B) initial polyoxyalkylene chain segments having an average oxygen to carbon atom ratio of not more than 0.4 attached at one end thereof to the nucleus of said organic reactive hydrogen compound at the site of each reactive hydrogen atom, said first initial chain segments consisting of polymers of oxyalkylene groups selected from the group consisting of oxypropylene, oxybutylene and mixtures of said oxyalkylene groups with each other and oxyethylene groups, the molecular weight of said organic reactive hydrogen compound and said attached initial chain segments being within the range of about 200 to about 2,000;
   (C) second polyoxyalkylene chain segments having an average oxygen to carbon atom ratio of not less than 0.4 attached at one end to said first oxyalkylene chain segments, said polyoxyalkylene chains of said second component being selected from the group consisting of oxyethylene groups and mixtures of oxyethylene groups with mixtures of oxypropylene groups, and constituting 5 to 35 wt.% of the combined weight of said organic reactive hydrogen compound and said attached initial chain segments;
   (D) and third oxyalkylene chain segments attached at one end to said second oxyalkylene chain segments, said third polyoxyalkylene chain segments having an average oxygen to carbon atom ratio of not more than 0.4 and consisting of polymers of oxyalkylene groups selected from the group consisting of oxypropylene, oxybutylene and mixtures of said groups with each other and mixtures of said oxyethylene groups, the total molecular weight of said mixture of conjugated polyoxyalkylene compounds being within the range of about 2,000 to about 25,000.

2. A mixture of conjugated polyoxyalkylene compounds for use in the preparation of polyurethanes, said compounds consisting of:
   (A) the nucleous of an organic reactive hydrogen compound selected from the group consisting of polyhydroxy compounds, amines and propylene oxide adducts of said compounds having three to eight reactive hydrogen atoms per molecule;
   (B) initial polyoxypropylene chain segments attached at one end thereof to the nucleus of said organic reactive hydrogen compound at the site of each reactive hydrogen atom, said initial polyoxypropylene chain segments having an average molecular weight within the range from about 800 to about 1,500;
   (C) second polyoxyethylene segments attached at one end to said first oxypropylene chain segments and constituting about 5 to 35 wt. percent of the combined eight of said organic reactive hydrogen compound and said first polyoxypropylene chain segments;
   (D) and third oxypropylene chain segments attached at one end to said second oxyethylene chain segments, the total molecular weight of said mixture of conjugated polyoxyalkyl compounds within the range of from about 2,000 to 25,000.

3. The mixture of conjugated polyoxyalkylene compounds of claim 7 wherein the organic reactive hydrogen compound is selected from the group consisting of sorbitol, methyl glucoside and sucrose.

4. The compounds of claim 2 wherein the organic reactive hydrogen compound is trimethylolpropane.

5. The compounds of claim 7 wherein the organic reactive hydrogen compound is trimethylolpropane.

6. A mixture of conjugated polyoxyalkylene compounds said compounds consisting of:
   (A) the nucleus of an organic reactive hydrogen compound selected from the group consisting of polyhydroxy compounds, amines and propylene oxide adducts of said compounds having from three to eight reactive hydrogen atoms per molecule;
   (B) initial polyoxalkylene chain segments having an average oxygen to carbon atom ratio of not more than 0.4 attached at one end thereof to the nucleus of said organic reactive hydrogen compound at the site of each reactive hydrogen atom, said first initial chain segments consisting of polymers of oxalkylene groups selected from the group consisting of oxypropylene, oxybutylene and mixtures of said oxyalkylene groups with each other and oxyethylene groups, the molecular weight of said organic reactive hydrogen compound and said attached initial chain segments being within the range of about 200 to about 2,000;
   (C) second polyoxyalkylene chain segments having an average oxygen to carbon atom ratio of not less than 0.4 attached at one end to said first oxyalkylene chain segments, said polyoxyalkylene chains of said second component being selected from the group consisting of oxyethylene groups and mixtures of oxyethylene groups with mixtures of oxypropylene groups, and constituting 5 to 35 wt. percent of the combined weight of said organic reactive hydrogen compound and said attached initial chain segments;
   (D) third oxyalkylene chain segments attached at one end to said second oxyalkylene chain segments, said third polyoxyalkylene chain segments having an average oxygen to carbon atom ratio of not more than 0.4 and consisting of polymers of oxyalkylene groups selected from the group consisting of oxypropylene, oxybutylene and mixtures of said groups with each other and mixtures of said oxyethylene groups, the total molecular weight of said mixture of conjugated polyoxalkylene compounds being within the range of about 2,000 to about 25,000;
   (E) and fourth oxyalkylene chain segments attached at one end thereof to said third oxyalkylene chain segments, said fourth oxyalkylene chain segments constituting about 1 to about 15 wt. percent of the total weight of said mixture of polyoxyalkylene compounds, having an average oxygen to carbon atom ratio of not less than 0.4 and consisting of polymers of oxyalkylene groups selected from the group consisting of oxyethylene and mixtures of oxyethylene with at least one of oxypropylene and oxybutylene.

7. A mixture of conjugated polyoxyalkylene compounds, said compounds consisting of:
(A) the nucleus of an organic reactive hydrogen compound selected from the group consisting of polyhydroxy compounds, amines and propylene oxide adducts of said compounds having from three to eight reactive hydrogen atoms per molecule;
(B) initial polyoxypropylene chain segments attached at one end thereof to the nucleus of said organic reactive hydrogen compound at the site of each reactive hydrogen atom, said initial polyoxypropylene chain segments having an average molecular weight within the range from about 800 to about 1,500;
(C) second polyoxyethylene segments attached at one end to said first oxypropylene chain segments and constituting about 5 to 35 wt. percent of the combined weight of said organic reactive hydrogen compound and said first polyoxypropylene chain segments;
(D) third oxypropylene chain segments attached at one end to said second oxyethylene chain segments, the total molecular weight of said mixture of conjugated polyoxyalkylene compounds within the range of from about 2,000 to about 25,000.
(E) and fourth oxyethylene chain segments attached at one end thereof to said third oxyalkylene chain segments, said fourth oxyethylene chain segments constituting about 1 to about 15 wt. percent of the total weight of said mixture of polyoxayalkylene compounds.

References Cited
UNITED STATES PATENTS

| | | | |
|---|---|---|---|
| 2,944,979 | 7/1960 | De Groote et al. | |
| 2,944,981 | 7/1960 | De Groote et al. | |
| 2,945,025 | 7/1960 | De Groote et al. | 260—209 |
| 2,996,551 | 8/1961 | De Groote et al. | 260—209 |
| 3,042,666 | 7/1962 | Gentles | 260—210 |
| 3,048,548 | 8/1962 | Martin et al. | |
| 3,277,076 | 10/1966 | Yotsuzuka | 260—210 |

JAMES O. THOMAS, JR., Primary Examiner

U.S. Cl. X.R.

260—25, 210, 268, 613, 615, 570.6.

UNITED STATES PATENT OFFICE

CERTIFICATE OF CORRECTION

Patent No. 3,535,307      Dated October 20, 1970

Philip H. Moss and Michael Cuscurida
Assignors to Jefferson Chemical Company, Inc.
Houston, Texas, a corporation of Delaware It is certified that errors appear in the above-identified patent and that Letters Patent are hereby corrected as shown below:

In column 7, line 54, "Hyflow" should read -- Hyflo --. In column 8, line 8, -- oxalic -- should be added before the word "acid." In column 9, line 23, "1.13" should be deleted and -- 0.13 -- substituted; in column 9, line 27, the comma preceding "0.05" should be deleted; in column 9, line 29, "6.0" should be deleted and -- 6.4 -- substituted. In column 10, line 15, "eight" should be deleted and the word -- weight -- substituted; in column 10, line 21, "polyoxyalkyl" should be deleted and -- polyoxyalkylene -- substituted. In column 12, line 9, "polyoxayalkylene" should be deleted and -- polyoxyalkylene -- substituted.

SIGNED AND
SEALED
MAR 9 1971

(SEAL)
Attest:

Edward M. Fletcher, Jr.
Attesting Officer

WILLIAM E. SCHUYLER, JR.
Commissioner of Patents